Dec. 2, 1958     K. B. BREDTSCHNEIDER     2,862,729
FLEXIBLE BELLOWS SEAL FOR FLANGED PIPE JOINT
Filed Feb. 10, 1955     2 Sheets-Sheet 1
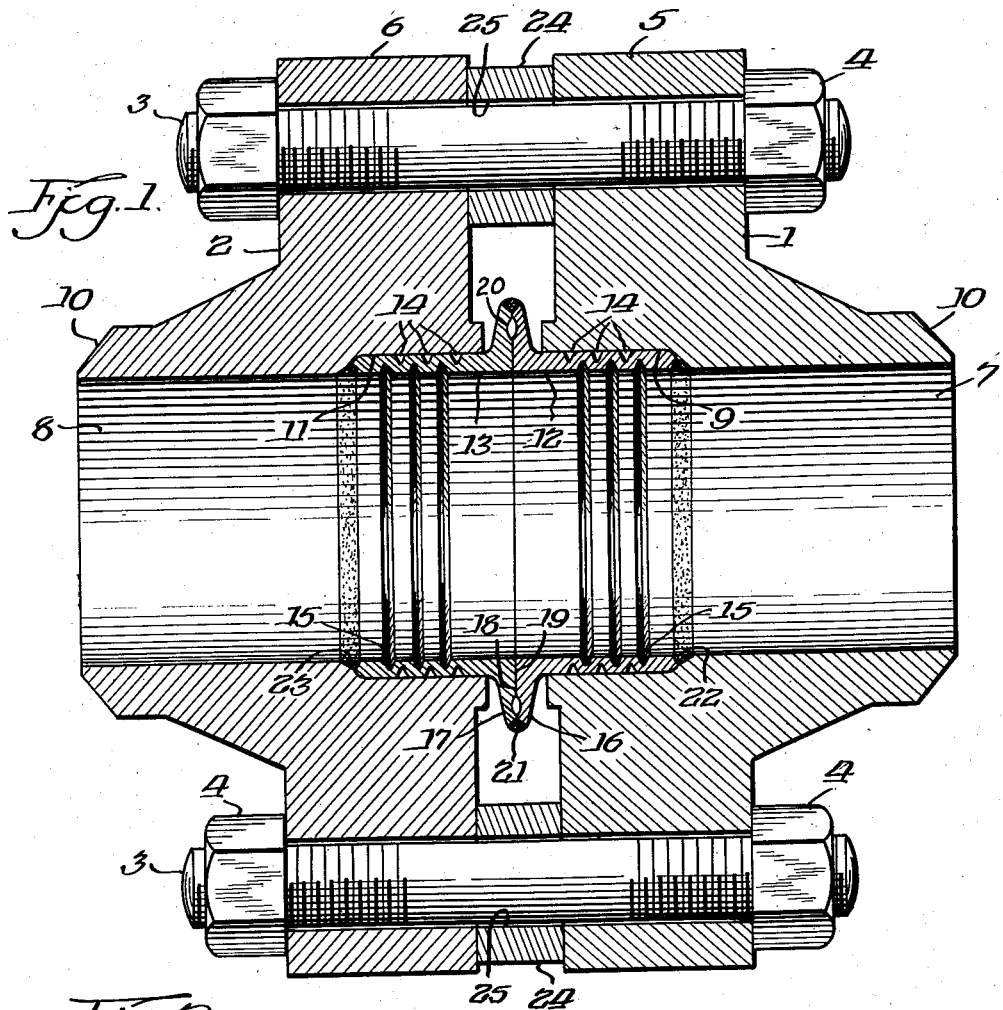
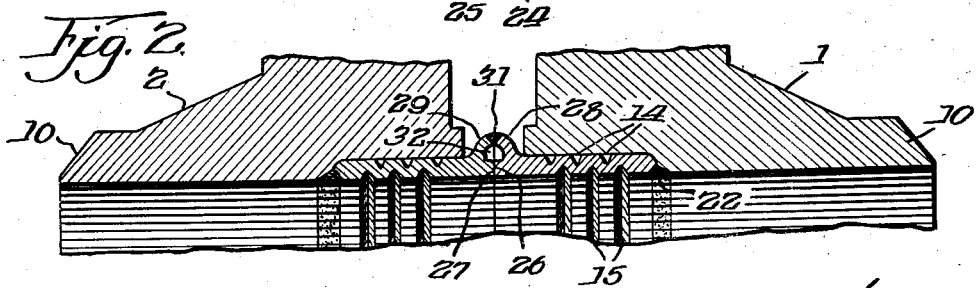
Inventor:
Kurt B. Bredtschneider
By Joseph O. Lange
Atty.

United States Patent Office 2,862,729
Patented Dec. 2, 1958

2,862,729

FLEXIBLE BELLOWS SEAL FOR FLANGED PIPE JOINT

Kurt B. Bredtschneider, Chicago, Ill., assignor to Crane Co., Chicago, Ill., a corporation of Illinois Application February 10, 1955, Serial No. 487,242

3 Claims. (Cl. 285—114)

This invention relates to a lip type of flanged joint for conveyance of fluids and more particularly is concerned with a form of coupling embodying the invention.

In connection with the use of absolutely tight joints on exceedingly high temperatures and pressures, the matter of providing such joint performance becomes a difficult and frequently quite critical problem, particularly realizing the need for handling not only very high temperatures, but also possessing in such joints desirable flexibility in response to changes in temperature as, for example, those which may occur when the line is out of operation temporarily or if a fluid is subsequently used at substantially lower temperatures in the same pipe line during the course of processing.

It has been discovered that if relatively flexible members are installed within and between substantially fixed or rigidly mounted coupling members, such as a pair of relatively heavy flanges, a type of joint is produced which possesses such desirable flexibility as above referred to for the many variable pressure and high temperature conditions encountered.

Therefore, it is an important object of this invention to provide a lip joint in which internal filler pieces are installed between a pair of coupling halves, such as flanges, whereby after the desired tightening load is applied either by bolts or similar means for drawing the flanges together, support pieces of a character hereinafter described are introduced into the space between the two coupling halves to substantially bring a clearance between the flanges to zero.

It is a further object to provide that after such step is taken, the bolts or other drawing means are stressed further by suitable tightening and thus creating ultimately a stiff or rigid coupling with the inner seal ring as hereinafter described being substantially protected against external pipe bending stresses, such as those that are normally encountered with a valve or fitting applied in a pipe line.

Other objects and advantages will become more readily apparent upon proceeding with the description of the device embodying my invention, in which Fig. 1 is a sectional assembly view of a preferred embodiment of the invention.

Fig. 2 is a fragmentary sectional view of a modified form.

Similar reference numerals refer to similar parts throughout the several views.

Figure 3:
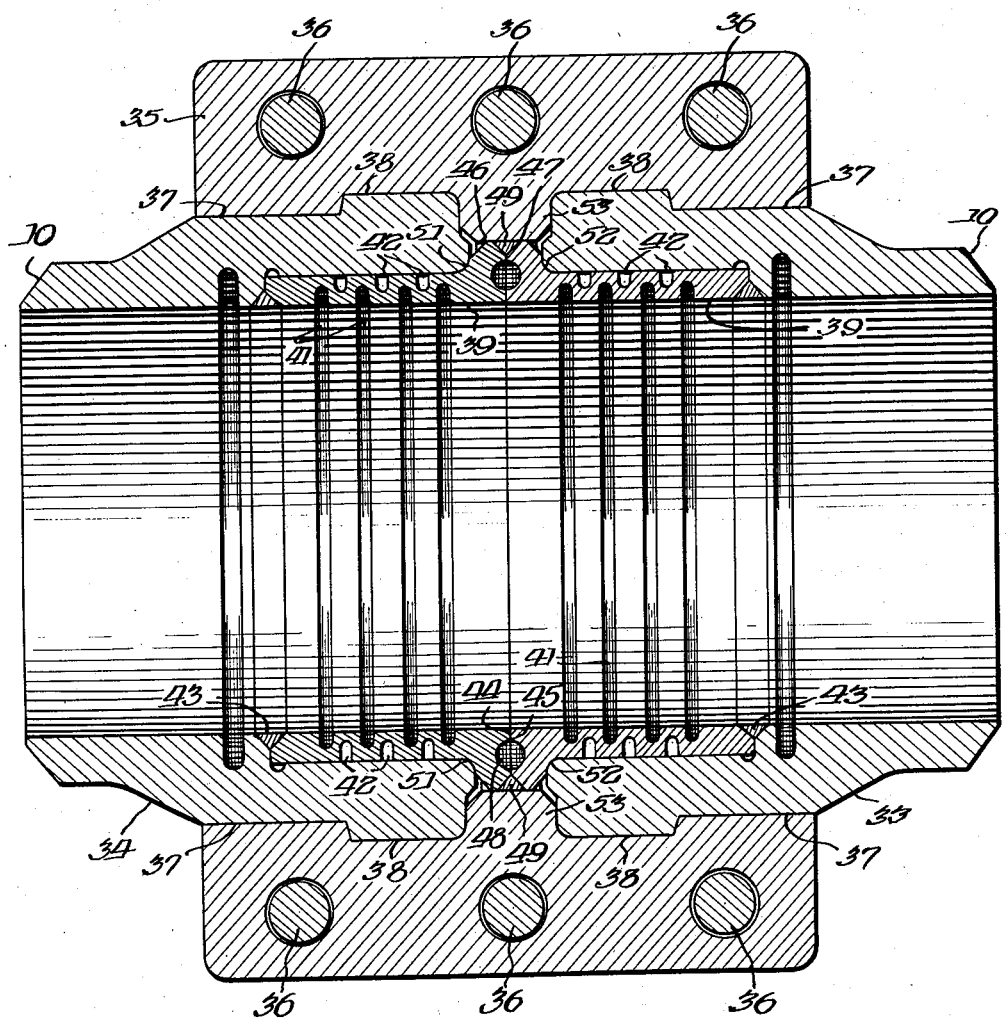
Fig. 3 is a sectional assembly view of a further modified form.

Referring now to Fig. 1, in order to make a preferred form of joint, the complementary flanges 1 and 2 are employed having suitable drawing-up means, such as the bolt studs 3 and nuts 4, extending through the flanges 5 and 6, the flanges being provided with the usual passages or ports 7 and 8 forming a through-way by the respective latter passages. Suitable connecting ends 10 are provided for attachment to a pipe line. A relieved annular portion at 9 and 11 is provided to receive the respective complementary bellows or rings 12 and 13. The bellows or rings in order to impart comparative flexibility thereto are formed on both exterior and interior portions with annular serrations 14 and 15 respectively. In abutting relation to each other and preferably integral therewith the respective end disposed flanges 16 and 17 are provided, the flanges having the suitably finished surfaces 18 and 19 to form a fluid tight sealing surface therebetween. The outer periphery of the flanges 16 and 17 are joined by an annularly disposed fusion weld 21. An annular chamber 20 provides for added flexibility in the flanges without impairing the effectiveness of the said weld.

At each outer end portion of the respective bellows, as at 22 and 23, the latter members are either welded or otherwise suitably brazed or sealed in fluid tight relation by attachment to the respective flanges 1 and 2 at the outer end limits of the respective flange recesses 9 and 11.

It has been discovered that in order to avoid placing any excessive longitudinal or torsional stresses upon the sealing bellows during the completion of such joint assembly when the respective flanges 1 and 2 are being drawn together to form the fluid-tight assembly that this can be done safely, conveniently and economically by interposing as a filler means between the flanges 5 and 6 a plurality of annularly spaced-apart ring members 24 having the apertures 25 to fit over the bolt studs 3 as shown. Thus, it will be clear that with the proper and accurate selection for each bolt stud of the necessary insert members or filler pieces 24 with respect to their overall length the pipe joint can be properly drawn up without danger of overstressing the bellows. The bolts may then be drawn up additionally over and above that stress originally applied during the course of fabricating or joining together of the bellows halves. Thus, it is clear that a stiff and substantial coupling has been provided with the lip seal adequately protected against any internal pipe bending stress.

In this connection, if desired, and as a substitute for the filler members 24, there may be placed between the bolts wedge-like members of similar configuration to maintain the flanges 5 and 6 predeterminately apart under stress conditions of predetermined loading.

It should, of course, be apparent that the specific manner in which the weld seal at 21 is accomplished may vary depending upon the degree of flexibility desired in the bellows assembly. In this connection, attention is directed to a modified form of the structure shown in Fig. 2 in which, in all respects the manner of making the flanges, assembling them and creating the fluid tight bellows seal within the recesses of the flanges is identical to that described in connection with Fig. 1. However, in the instant modification, the bellows instead of having the annular transverse flanged portion as described at 16 and 17 in Fig. 1 the integral flanges are of an annular curved cross-sectional form in which the abutting surface contact at 26 and 27 is augmented by means of the annular curved and turned-up outer ring portions 28 and 29 respectively, the latter being sealed at their outer limits as at 31 and thereby creating an annular chamber 32 within which the desired degree of flexibility may be imparted and which is outwardly sealed by means of the annular weld 31.

It will, of course, be appreciated that in this modified construction, as distinguished from the structure of Fig. 1, additional flexibility is imparted, such that in the event a slight separation of flanges should occur of the surfaces 26 and 27, it is quite unlikely that any line foreign matter or sediment entering between such surfaces would be objectionable in that no added stress would be placed upon the weld 31. Because of the degree of flexing provided by the curved annular sections of the bellows at 28 and 29, such added stresses would be readily absorbed.

Further, the annular chamber 32 could easily receive such materials from the line and under certain conditions permit the surfaces 26 and 27 to again be joined without destroying the efficiency of the joint.

In a still further modified form as shown in Fig. 3, instead of employing bolts to draw the flanges 33 and 34 together a split clamp member 35 may be used, held together by the transversely extending bolts indicated generally at 36 to enclose as at 37 the flanges 33 and 34 in comparatively snug relation and also engaging the annular projections 38. In this modification, the interposed gasket may consist of a pair of serrated sleeves 39 with serrations on the inner and outer surfaces for the reasons hereinabove described as indicated at 41 and 42 and being weldably attached or otherwise connected as at 43 to the respective flanges 33 and 34. Suitable contact surfaces are formed at 44 and 45 by means of annularly curved integral portions 46 and 47. The chamber 48 on its outer limits is weld sealed as at 49. The flanged portions as at 46 and 47 are snugly retained at their fillet portions 51 and 52 respectively, and preferably the split clamp 35 is provided with an anular extension or projecting portion 53 to serve as a means for snugly retaining the weld portion 49 against outward expansion or deflection. In this type of structure, it will of course be appreciated that the projecting member 53 of the split clamp serves as an interposed filler thereby to prevent pipe line stress being transmitted directly and longitudinally against the assembled gasket halves 39 and therefore in this capacity serves in the same manner as the interposed filler pieces 24 described in connection with the other views.

It will thus become apparent that three types of joints provide a very substantial means of protection for the relatively more fragile type of sealing element provided by the co-acting bellows shown. The pipe joint itself may be subjected to severe structural line stresses due to thermal changes or misalignment and increases in pressure, or, perhaps, other mechanical distortion in the pipe line itself. Yet the flanges because of the substantial reinforcing character are provided by the filler members 24 will readily absorb such stresses or strains without objectionably affecting the efficiency of the bellows assembly. Under certain conditions, the flange portions 16 and 17 and the rings fitted in chambers 9 and 11 may be made integral with the members 1 and 2.

It will, therefore, become apparent that while only three forms of my invention have been shown as preferred embodiments, other related assemblies may be employed using various shapes or forms of seals without changing or departing from the scope of the invention.

Accordingly, its scope should be measured by the appended claims.

I claim:

1. In a combined mechanically assembled and weld sealed joint comprising a pair of axially spaced aligned oppositely disposed recessed flanges, annularly mounted means on outer portions of said flanges to maintain said latter members in fixed assembly in said axially aligned relation, axially aligned relatively thin wall substantially cylindrical inserts of axially flexible bellows form positioned in the recesses of said flanges in end abutting connection, each of the said inserts being received and supported peripherally in said flange recesses for substantially the full length of the peripheral portions of said inserts, the outer annular end limits of the said inserts being fixedly sealed to end annular limits of the flange recesses, the said inserts having enlarged annular portions lying immediatley outside of said flange recesses and between the said flanges, the latter enlarged annular portions having oppositely disposed curved lip portions joined in fluid sealing relation radially and axially outside of said recesses and in spaced apart annular relation to the end abutting connection of said inserts, the inner end adjoining limits of the inserts comprising the lip portions being substantially reduced in thickness with the adjoining limits having sharp annular corners forming feather edges for initiating a weld seal, the lip portions and weld seal forming outside of the insert end abutting connection a substantially annular chamber, the outer peripheral limits of the said chamber forming the weld seal and being defined by an annular thin weld joining the curved lip portions of the said inserts in fluid tight relation, and removable spacer means cooperating with said annularly mounted means on the flanges to hold the latter members in predetermined spaced apart axial relation when mounted in said fixed assembly.

2. The subject matter of claim 1, the said oppositely disposed curved lipped portions being inturned and of hook-like configuration in cross-section to form the said substantially annular chamber.

3. The subject matter of claim 1, the said removable spacer means comprising a split clamp member engaging annular projections on the flanges.

References Cited in the file of this patent

UNITED STATES PATENTS

| | | |
|---|---|---|
| 867,752 | Phillips | Oct. 8, 1907 |
| 1,493,269 | Kruesi | May 6, 1924 |
| 1,825,062 | Heaton | Sept. 29, 1931 |
| 1,926,107 | Morehead | Sept. 12, 1933 |
| 2,157,885 | Bailey | May 9, 1939 |
| 2,183,757 | Van Der Graff | Dec. 19, 1939 |
| 2,445,484 | Kopperman | July 20, 1948 |
| 2,582,249 | Hendel | Jan. 15, 1952 |
| 2,684,255 | Abele | July 20, 1954 |
| 2,739,828 | Schindler | Mar. 28, 1956 |
| 2,756,077 | Yates | July 24, 1956 |

FOREIGN PATENTS

| | | |
|---|---|---|
| 386,014 | Great Britain | Jan. 12, 1933 |